United States Patent [19]
Naka et al.

[11] Patent Number: 5,162,899
[45] Date of Patent: Nov. 10, 1992

[54] COLOR DATA CORRECTION APPARATUS ULTILIZING NEURAL NETWORK

[75] Inventors: Motohiko Naka, Kawasaki; Takehisa Tanaka, Tokyo; Takehiko Shida, Yokohama; Mie Saitoh; Kunio Yoshida, both of Kawasaki, all of Japan

[73] Assignee: Matsushita Electric Industrial Co., Ltd., Osaka, Japan

[21] Appl. No.: 493,539

[22] Filed: Mar. 14, 1990

[30] Foreign Application Priority Data

Mar. 15, 1989 [JP] Japan .................................. 1-62528

[51] Int. Cl.$^5$ .............................................. H04N 1/46
[52] U.S. Cl. ........................................ 358/80; 358/75; 395/22; 364/276.6; 355/326
[58] Field of Search ................ 358/80, 75, 443, 406; 382/14, 15; 364/513, 200, 276.6, 274.9, 900, 972.4; 355/326, 327; 395/22-25

[56] References Cited

U.S. PATENT DOCUMENTS

| | | | |
|---|---|---|---|
| 4,803,736 | 2/1989 | Grossberg et al. | 382/22 |
| 4,805,225 | 2/1989 | Clark | 382/39 |
| 4,999,668 | 3/1991 | Suzuki et al. | 355/38 |
| 5,014,219 | 5/1991 | White | 382/16 |
| 5,019,858 | 5/1991 | Suzuki | 355/38 |

FOREIGN PATENT DOCUMENTS

57-101840  6/1982  Japan .

OTHER PUBLICATIONS

"Color Rendition in Digital Printing" by Hiroaki Kotera, pp. 298-307.
"Parallel Distributed Processing" by David E. Rumelhart, James L. McClelland and the PDP Research Group, 1986 by the Massachusetts Institute of Technology pp. 319-355.

Primary Examiner—Edward L. Coles, Sr.
Assistant Examiner—Jill Jackson
Attorney, Agent, or Firm—Lowe, Price, LeBlanc & Becker

[57] ABSTRACT

A color correction apparatus for use in an apparatus such as a color copier for operating on data obtained by scanning and color analysis of a source image to obtain color density data for use in printing a copy of the source image, the correction apparatus containing a neural network. Parameter values of the neural network are established by repetitive computations based on amounts of difference between color density data previously used to print a plurality of color samples and color density data produced by the neural network in response to color analysis data obtained by analyzing these color samples.

10 Claims, 10 Drawing Sheets

COLOR DATA CORRECTION APPARATUS ULTILIZING NEURAL NETWORK

BACKGROUND OF THE INVENTION

1. Field of the Invention

The present invention relates to an apparatus for correction of data representing color information, obtained by analyzing a source image, to obtain corrected color data which can be utilized for example to print a copy of the source image.

2. Description of Prior Art

In recent years, various types of apparatus such as color copiers and color facsimile machines have been developed, in which a source color image (e.g. a color picture) is scanned by a light beam and the reflected light then analyzed to obtain color information representing the source image. In practice, the source image is processed as an array of picture elements, with one set of R, G, B (red, green, blue) primary color data values (referred to in the following as a set of $R_a$, $G_a$, $B_a$ values) being obtained for each picture element. The color attributes of each picture element are thereby completely defined, i.e. the hue, chrominance and lightness attributes, where "lightness" signifies a value in a grey-scale range extending from pure white to pure black. These are then corrected in some manner, to obtain a corresponding set of color density data values which are used to determine degrees of density of printing of colors of an output image. In a practical color printer apparatus, color correction processing produces a set of C, M, Y (cyan, magenta, yellow), or C, M, Y, K (cyan, magenta, yellow, black) color density values in response to each set of $R_a$, $G_a$, $B_a$ values that is obtained by scanning/analyzing the source image. However in the following it will be assumed for simplicity of description that only red, green and blue primary colors are used, i.e. that red, blue and green density values ($R_d$, $G_d$, $B_d$) are produced by color correction of the $R_a$, $G_a$, $B_a$ color analysis values.

The basic operations executed by a color copier apparatus are illustrated in the basic block diagram of FIG. 1. It will be assumed throughout the following specification that the description applies to a color copier apparatus, however the invention is equally applicable to various other types of apparatus such as a color facsimile apparatus, in which color data correction is required. The operation of the apparatus of FIG. 1 consists of sequentially scanning successive portions of an original color image 1, separating the level of reflected light from the image into three primary color components (assumed to be the red, green and blue primary components, designated as $R_a$, $G_a$, $B_a$) by an input section 2, converting the respective levels of these components into respective color density values (also assumed to represent the red, green and blue primary components, designated as $R_d$, $G_d$, $B_d$) by a color correction section 3, and supplying these to an output section 4 which actually executes printing of an output color image. In practice, the levels of the $R_d$, $G_d$, $B_d$ values will determine the levels of printer drive signals that are generated in the output section 4, and thereby determine the densities of printing of the respective primary colors. In such a color copier apparatus, primary color separation in the input section 2 is generally executed using dichroic filters, and the respective levels of red, green and blue light which are detected as electrical signals during scanning of the original image are converted into successive sets of $R_a$, $G_a$, $B_a$ digital values (i.e. for successive picture elements of the source image 1). All subsequent operations, up to the stage of controlling a printer section for executing a hard-copy print-out, are executed by processing of digital data values. The operation of converting the $R_a$, $G_a$, $B_a$ values into corrected $R_d$, $G_d$, $B_d$ (or $C_d$, $M_d$, $Y_d$) color density values which are utilized to control color printing is sometimes referred to as masking processing, or masking compensation.

The basic requirement for such a color copier apparatus is that the color attributes of each portion of a print-out image produced from the apparatus should match as closely as possible the color attributes of the corresponding portion of the original image. It is possible to achieve a high degree of accuracy of color separation of the reflected light obtained by scanning the original image; however any colorant that is used in color printing cannot provide a spectrally pure color, but is actually a mixture of colors. For this and other practical reasons, there is a non-linear relationship between the color analysis data obtained from a source image and the color density data that are actually required for accurately controlling reproduction of that image. It is therefore necessary to execute the aforementioned masking correction processing by the color correction section 2 in FIG. 1.

The entire range of possible color conditions that can appear in a source image (i.e. each color condition being a combination of hue, chrominance and lightness attribute values) can be represented as a finite region within a 3-dimensional color space. The problem which has to be solved by the color correction section 3 of FIG. 1 is to produce, in response to each source image picture element $R_a$, $G_a$, $B_a$ combination that is inputted thereto, a $R_d$, $G_d$, $B_d$ (or $C_d$, $M_d$, $Y_d$, or $C_d$, $M_d$, $Y_d$, $K_d$) combination which will result in the output section 4 printing a picture element in the output image 5 whose color will approximate as closely as possible that of the source image picture element. Two basic methods have been used in the prior art for achieving this. One method (described for example by Kodera in "Color Reproduction by Digital printer", Image Electronics Conference, May. 14, 1985) is to utilize a set of polynomial equations into which each set of $R_a$, $G_a$, $B_a$ values is inserted as a set of variables, and from which a corresponding set of $R_a$, $G_a$, $B_a$ (or $C_d$, $M_d$, $Y_d$ or $C_d$, $M_d$, $Y_d$, $K_d$) values is obtained as output. The equations may contain only linear terms, or may contain both linear and non-linear terms. The coefficients of these equations constitute color correction parameters, and can be determined based on computations on the results of experimental measurements, i.e. results obtained by scanning and printing out a large number of color samples, which are distributed within the aforementioned color space. With such a method it is possible to derive a set of coefficients for the polynomial equations such as to ensure that accurate color printing is obtained for each of the color samples (i.e. each having a specific combination of hue, chrominance and lightness). However, in order to achieve a reasonable degree of accuracy for colors which are intermediate between those of the samples, it is necessary to use a very large number of coefficients. This would result in a lengthy computation having to be executed to obtaining color density data for each picture element. In addition, the relationship between each $R_a$, $G_a$, $B_a$ set and the corresponding $R_d$, $G_d$, $B_d$ (or $C_d$, $M_d$, $Y_d$ set) in each range extending between two adjacent color samples (in the 3-dimensional color space) will in general vary in a non-linear manner, and it is not possible to accurately compensate for that non-linearity simply by the aforementioned polynomial equation computatations, since the type of non-linearity will vary in an arbitrary manner in accordance with such factors as the characteristics of the printing inks (which determine, for example, a degree of printing color density change that will occur in response to a change in printer drive signal level), and will also be altered by manufacturing variations of the printer components, etc. Alternatively stated, such a method cannot ensure uniform accuracy of approximation over a wide range of values, within the 3-dimensional color space, between input ($R_a$, $G_a$, $B_a$) and corresponding output ($R_d$, $G_d$, $B_d$, or $C_d$, $M_d$, $Y_d$) color data values. Thus, such a prior art method does not provide a satisfactory degree of accuracy of reproduction over a wide range of source image color values. A color correction method using a function generator and weighting adders has been described by by Yoshida in Japanese Patent No. 57-101840, which has similar disadvantages to those described above.

With a second method that has been proposed in the prior art, a table memory is established, in which is stored a large number of sets of color density (rbgd or $C_d$, $M_d$, $Y_d$) data values, with input ($R_a$, $G_a$, $B_a$) data values being used as address information for read-out from the table memory. However in practice it is necessary to derive the stored values of color density data values by using one of the methods described above, based on computations using a set of fixed coefficients which have been derived by utilizing a limited number of color samples. Thus, such a method will of course have the same disadvantage of a lack of reproduction accuracy that has been described above.

SUMMARY OF THE INVENTION

It is an objective of the present invention to overcome the disadvantages of the prior art as set out above, by providing a color data correction apparatus in which a neural network is used to derive, from color analysis data values obtained by color analysis of a source image, corresponding color density data values for use in reproducing the source image, e.g. by directly printing a copy of the source image in accordance with the color density data values.

More specifically, a color data correction apparatus according to the present invention is applicable to a color image reproducing apparatus which includes means for scanning and color-analyzing an input image to derive color analysis data for the image, and color data correction means for operating on the color analysis data to obtain color density data for use in reproducing the input image, with the color data correction means comprising a neural network which receives the color analysis data and produces the color density data.

When the invention is applied to a color image reproducing apparatus which includes printing means responsive to the color density data for reproducing the source image as a printed color output image, parameter values of the neural network are established based on a comparison between color density data used to print a sample output image formed of a plurality of color samples and color density data produced by the neural network in response to color analysis data generated by scanning and color analysis of the sample output image.

DESCRIPTION OF PREFERRED EMBODIMENTS

Figure 1:
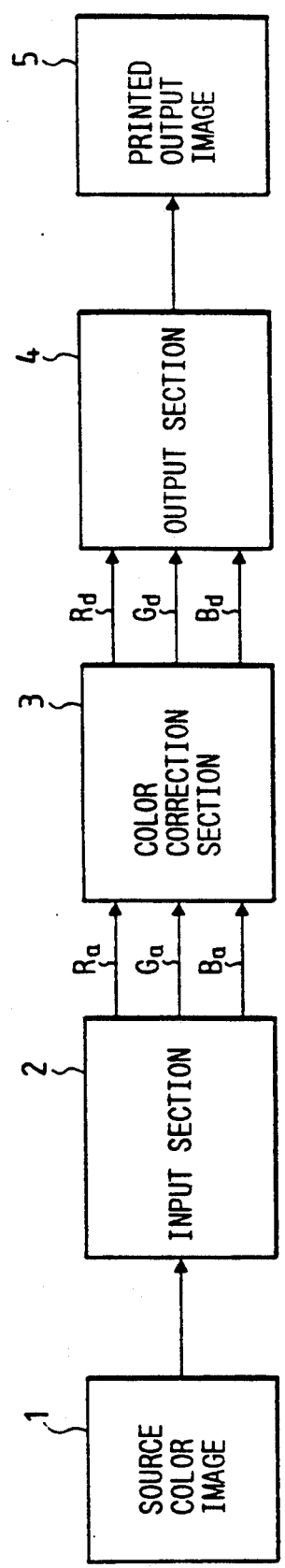
FIG. 1 is a block diagram for describing the basic features of an apparatus employing color data compensation processing.
Figure 2:
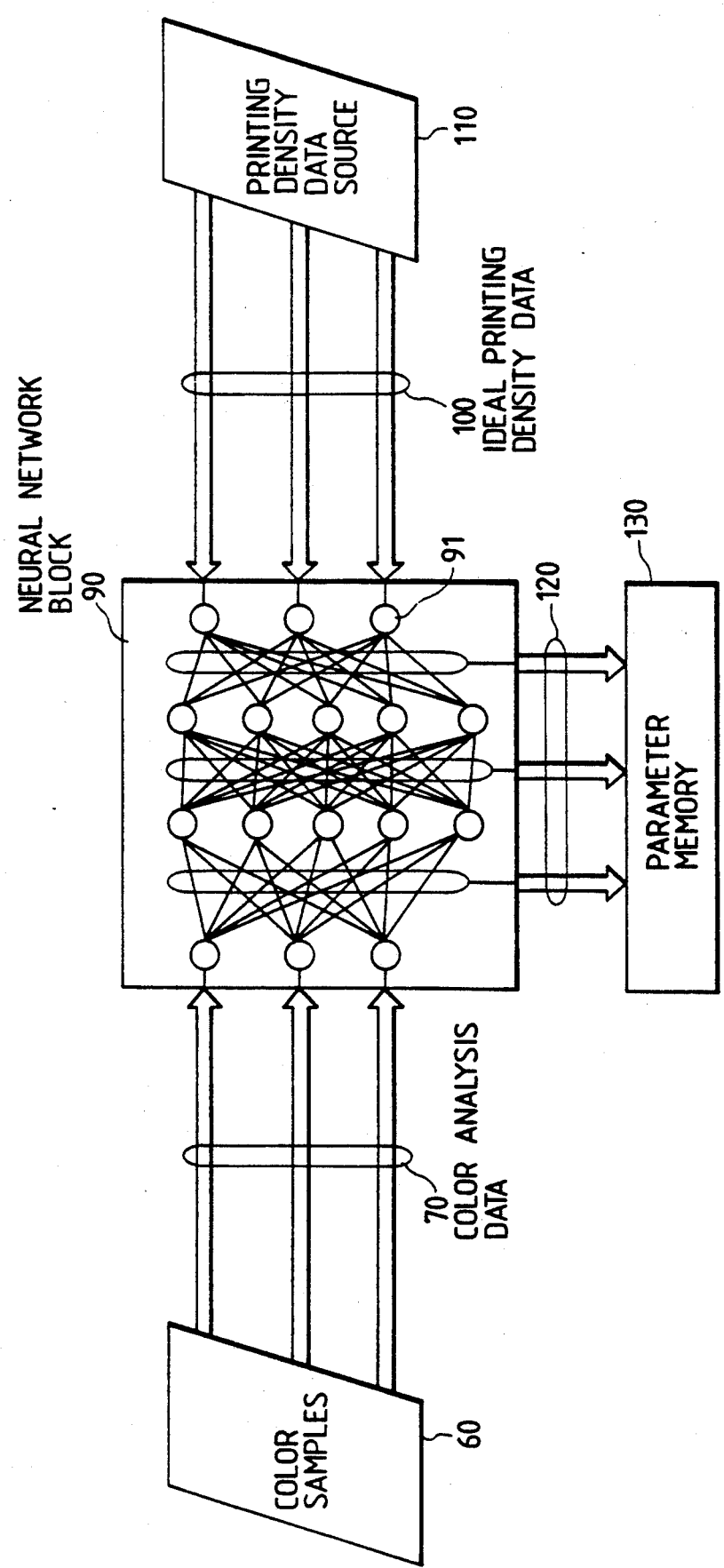
FIGS. 2 and 3 are conceptual block diagrams for describing the basic principles of color data correction utilizing a neural network in an apparatus according to the present invention.
Figure 3:
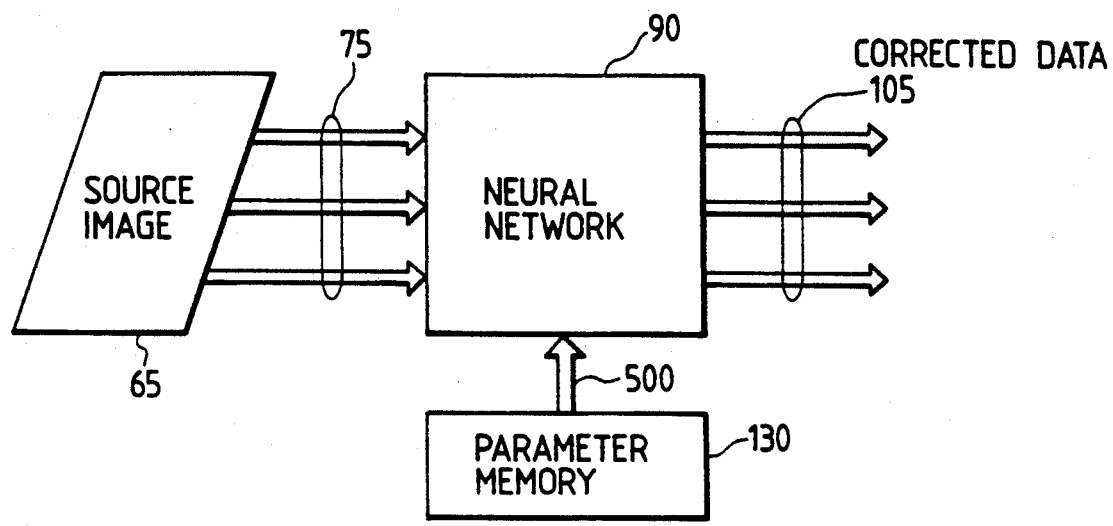

FIGS. 2 and 3 are conceptual block diagrams for describing the basic principles of employing a neural network for color data correction. FIG. 2 illustrates an arrangement for "learning" a set of neural network parameter values, utilizing an adaptive algorithm, based on a set of color samples. In FIG. 2, a neural network block 90 includes a neural network formed of a number of neuron units 91, which are mutually interconnected as described hereinafter such that outputs from respective neuron units are multiplied by specific weighting coefficients (which constitute the parameter values of the neural network) and the results are inputted to other neuron units. Color analysis data 70 obtained by analysis of a plurality of color samples 60 are inputted to the neural network of the neural network block 90, with the data being supplied for one color sample at a time. At the same time, ideal printing density data corresponding to that color sample are inputted to the neural network block 90 from a source 110, and are compared with output data values produced from the neural network in the neural network block 90. The comparison results are then used to compute an updated set of weighting coefficients for the neural network, using the aforementioned algorithm. This process is repetitively executed, until a desired degree of convergence is reached, i.e. until the output values produced from the neural network become sufficiently close to the ideal printing density values. When convergence has thus been achieved for the first color sample, the process is repeated for the next color sample (starting with the finally obtained set of weighting coefficients that were obtained for the first color sample), and so on. When all of the color samples have been processed, the finally obtained set of weighting coefficients are stored in the parameter memory 130.

Thereafter, during copying of a source image 65 as shown in FIG. 3, these weighting coefficients are set into the neural network, whereby color data correction is executed of data values 75 obtained by scanning the source image, with corrected data 105 being produced from the neural network block 90. The corrected data can now be utilized as color density data for printing a copy of the source image.

Figure 4:
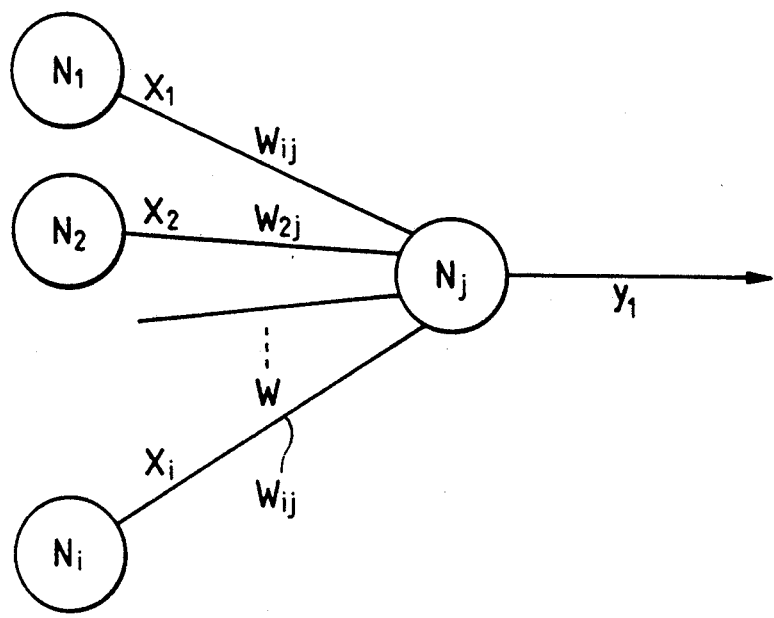
FIG. 4 is a diagram for describing the operation of neuron units of a neural network.

Each of the neuron units 91 in FIG. 2 has a non-linear characteristic with respect to the sum total of the input data values applied thereto, which can be for example a sigmoid form of characteristic. The neuron unit operation is illustrated in FIG. 4, in which a set of i neuron units $N_l$ to $N_i$ produce respective output values $x_l$ to $x_i$, which are respectively multiplied by weighting coefficients $W_{l,j}$ to $W_{i,j}$, with the results being applied to respective inputs of a neuron unit $N_j$. The neuron unit $N_j$ produces an output value y which is related to the sum total of the input values as:

$$y = F\{(w_{lj} \times x_l) + (w_{2j} \times x_2) \ldots (w_{ij} \times x_i)\}$$

In the above, F{ } denotes a non-linear function.

Figure 5:
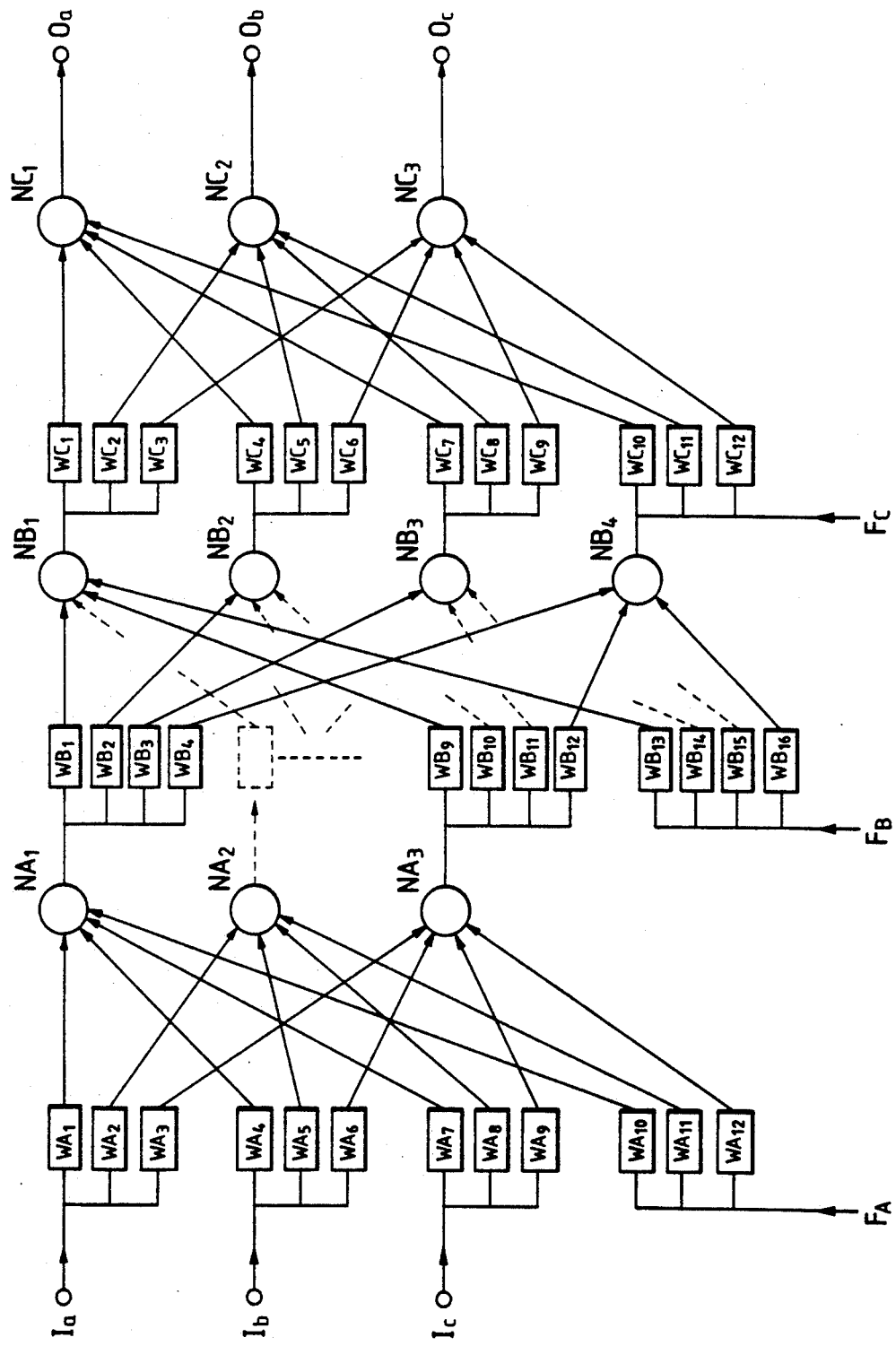
FIG. 5 is a block diagram illustrating an example of a neural network for use in an apparatus according to the present invention.

FIG. 5 is a diagram for describing the basic principles of a neural network. An arbitrary pattern of data values $I_a$, $I_b$, $I_c$ each consisting of a set of one or more parallel bits, is applied to the network, with a resultant output data value pattern $O_a$, $O_b$, $O_c$ being produced from the network. By determining suitable values for respective weighting coefficients $WA_1$, $WA_2$, ..., $WC_{12}$ of the network, any desired pattern of output values can be established for $O_a$ to $O_c$ in response to a specific input pattern $I_a$ to $I_c$. Furthermore, it is possible (by repetitively applying an adaptive algorithm) to determine a single set of values for the weighting coefficients $WA_1$, $WA_2$, ... $WC_{12}$ such that for each of a number of specific input patterns (e.g. obtained from respective color samples), a corresponding desired output pattern (e.g. a corresponding set of "ideal" printing density values for the respective sample colors) is produced. It then becomes possible to obtain interpolated output patterns from the network in response to input bit patterns that are intermediate between the aforementioned specific bit patterns. Alternatively stated, a set of weighting coefficients can be established such that an input region representing (within a color space) a range of colors that are to be reproduced can be mapped into a corresponding output region (derived using a number of "ideal" printing density values) representing the range of colors that can actually be printed, such that for each point (represented by an $R_a$, $G_a$, $B_a$ vector) of the input region, a corresponding point (represented by an $R_d$, $G_d$, $B_d$ vector) in the output region can be obtained from the neural network.

In FIG. 5, the input value $I_a$ is multiplied by each of a set of three weighting coefficients $WA_1$ to $WA_3$. Similarly, the input value $I_c$ is multiplied by each of the weighting coefficients $WA_4$ to $WA_6$, and the input value $I_d$ is multiplied by each of the weighting coefficients $WA_7$ to $WA_9$. The respective sets of results obtained from these multiplications are applied to corresponding inputs of a set of neuron units $NA_1$ to $NA_3$ of a first neuron unit layer, i.e. with one of each of the aforementioned sets of results being inputted to a first neuron unit $NA_1$, one of each of the second set of results being inputted to a second neuron unit $NA_2$, and so on. In addition, a fixed input data value $F_A$, that is supplied to an input terminal is multiplied by each of a set of weighting coefficients $WA_{10}$ to $WA_{12}$, and the respective results applied to inputs of each of the neuron elements $NA_1$ to $NA_3$.

The output results thus obtained from the first neuron unit layer are then similarly processed, in conjunction with a fixed data value $F_B$, by a set of weighting coefficients $WB_1$ to $WB_{16}$, and the results inputted to a set of four neuron units $NB_1$ to $NB_4$ of a second neuron unit layer. The output results thus obtained, in conjunction with a fixed data value $F_C$, are then multiplied by a set of weighting coefficients $WC_1$ to $WC_{12}$ in a similar manner to the input values $R_a$ to $G_a$, and the results inputted to a set of three neuron units $NC_1$ to $NC_3$ of an output neuron unit layer. Three output values $O_a$, $O_b$ and $O_c$ are thereby obtained as outputs from the neuron units $NC_1$ to $NC_3$ respectively.

Such a neural network can be implemented either in hardware form, or in "software" form (i.e. by microprocessor operations executed under a suitable control program). The weighting coefficients can consist for example of values stored in respective registers. During a parameter value "learning" operation, as described in the following, these are repetitively updated based on results obtained from adaptive algorithm computations.

Figure 6:
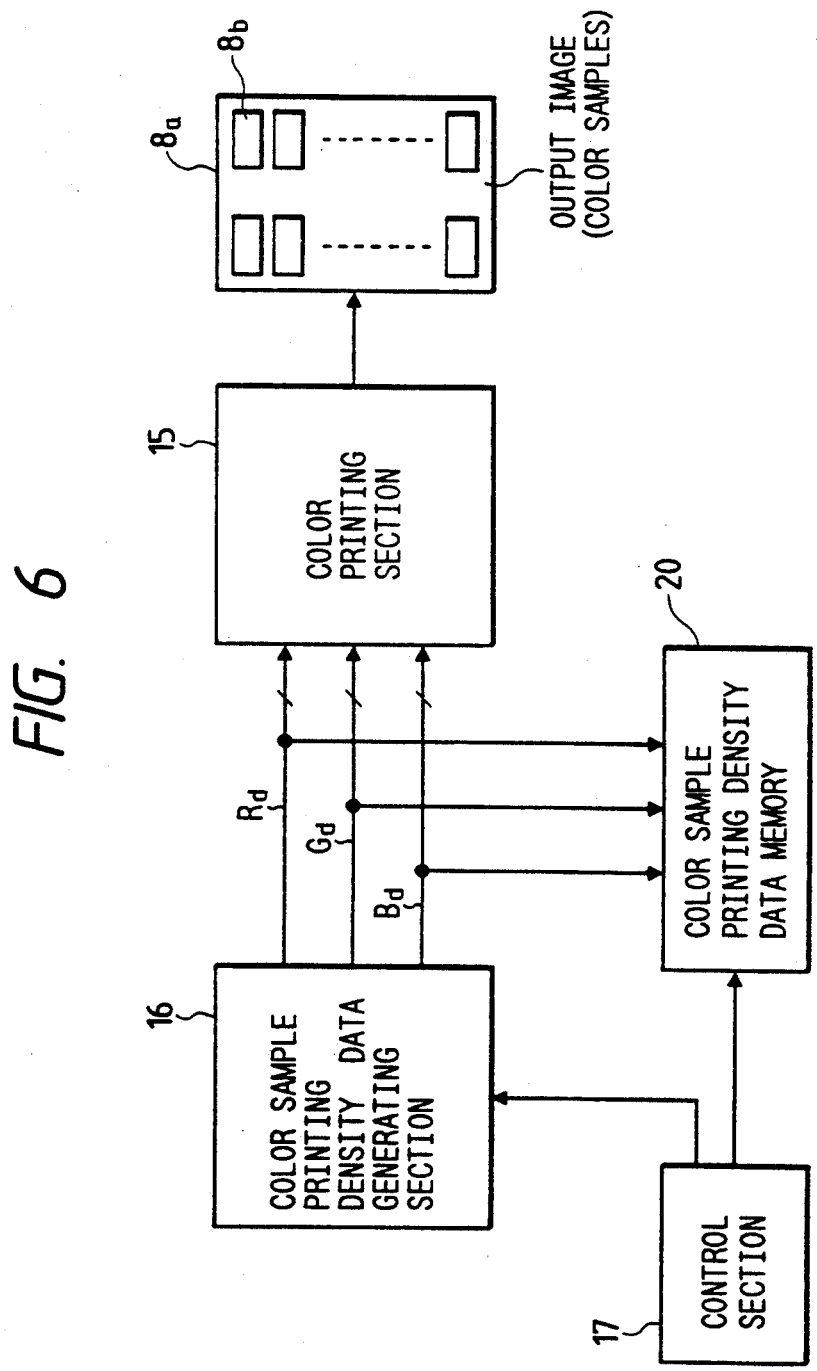
FIG. 6 is a block diagram showing portions of an embodiment of the invention applied to a color copier apparatus, configured for printing a plurality of color patches as color samples.
Figure 7:
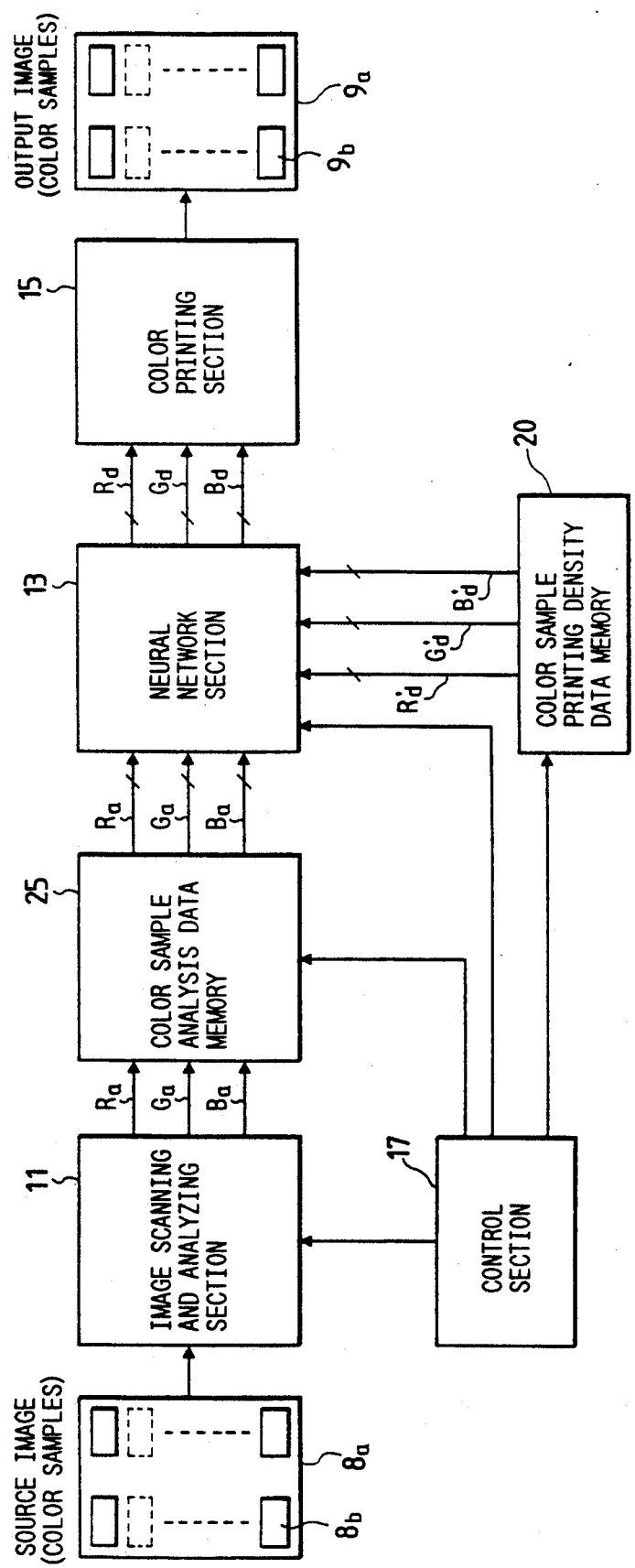
FIG. 7 is a block diagram showing the color copier apparatus embodiment configured for executing neural network parameter value "learning" operation and storing of finally obtained parameter values.

An embodiment of a color copier apparatus according to the present invention will be described in detail in the following. The overall operation of the embodiment is illustrated in the flow diagram of FIG. 9. Before executing the "learning" operation to obtain parameter values for the neural network of this embodiment, it is necessary to obtain target color density values for comparison with output values produced from the neural network. This is done by printing out a number of color samples, while storing the color density values that are actually used in printing these samples. FIG. 6 is a block diagram showing components of the embodiment that are required for preparing a set of color patches (i.e. printed color samples) 8b as a printed output image 8a, and for storing the color density data values that are actually used to print out the respective color patches. A sample printing density data generating section 16 consists of means for generating respective $R_d$, $G_d$, $B_d$ data value sets for the color patches 8b. Various methods can be envisaged for implementing the sample printing density data generating section 16, which should enable an appropriate (color space) distribution of color samples within a range in which maximum accuracy of reproduction is required, for example within a range of low saturation colors (i.e. pastel colors). The output data values from the sample printing density data generating section 16 are supplied to a color printing section 15 and a color sample printing density data memory 20. While a specific $R_d$, $G_d$, $B_d$ combination is being supplied to the color printing section 15, picture elements having the corresponding color attributes are printed out to form a corresponding one of the color patches 8b. While each color patch is being printed, the corresponding $R_d$, $G_d$, $B_d$ data value combination is stored in an address of the the color sample printing density data memory 20 under the control of output signals from a control section 17. Upon completion of printing the color patches 8b, the corresponding $R_d$, $G_d$, $B_d$ data values are left stored in the color sample printing density data memory 20 (as the "ideal" printing density data 100 of FIG. 2), and the apparatus is then reconfigured to become as shown in FIG. 7. The above process corresponds to steps S1 to S3 in FIG. 9.

It should be noted that the sample printing density data generating section 16 and color sample printing density data memory 20 are not necessary as components of the final color copier apparatus, and can be units which are used only at the stage of manufacture.

In FIG. 7, the apparatus comprises an image scanning and analyzing section 11 which executes light beam scanning of a source image to obtain respective $R_a$, $G_a$, $B_a$ data value combinations for successive picture elements, a sample analysis data memory section 25, a neural network section 13 which includes a neural network, and the color printing section 15, control section 17 and color sample printing density data memory 20. Data obtained by scanning the source image color patches 8b (i.e. respective $R_a$, $G_a$, $B_a$ combinations for the color patches 8b) are written into the sample analysis data memory section 25 while neural network parameter value "learning" operation is executed, and are thereafter processed by the neural network of the neural network section 13 to obtain $R_d$, $G_d$, $B_d$ data which are supplied to the color printing section 15 for use in parameter value "learning" processing, and for printing a copy of the source image, as an output image 9a. The color patches 9b of the output image can then be compared with the original color patches 8a, to determine the accuracy of reproduction that has been attained.

In this embodiment, each of the $R_a$, $G_a$, $B_a$ and $R_d$, $B_d$, $G_d$ values consists of 8 bits, supplied in parallel.

Figure 8:
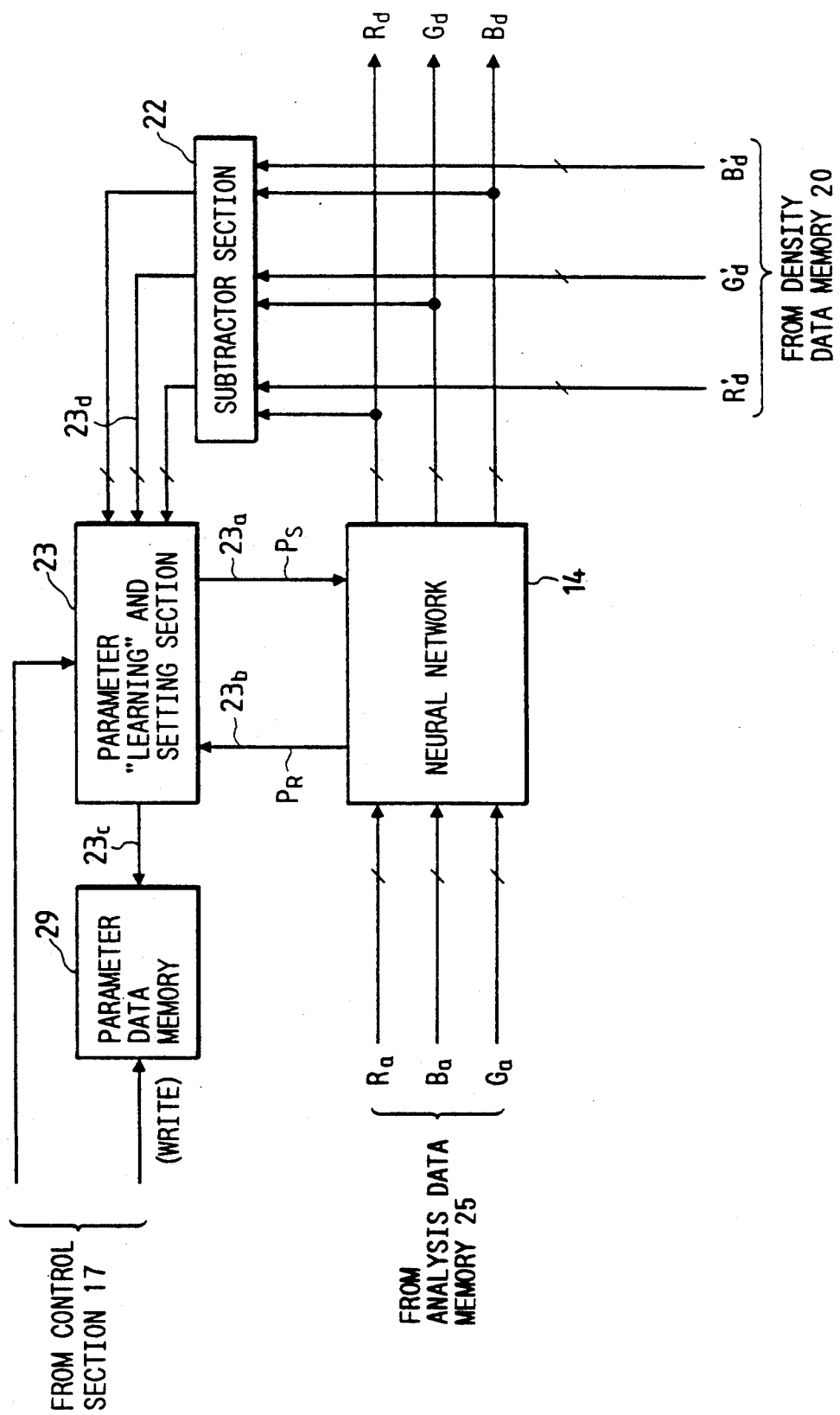
FIG. 8 is a block diagram showing the internal configuration of a neural network section of the color copier apparatus embodiment during the "learning" operation of FIG. 7.

FIG. 8 shows the internal configuration of the neural network section 13 during parameter value "learning" operation. This is based on a neural network 14, which receives successive $R_a$, $G_a$, $B_a$ combinations for the color patches 8b, read out from the sample analysis data memory section 25. A parameter data memory 29 serves to store parameter value data (corresponding to respective weighting coefficients of the neural network 14), derived by "learning" processing that is executed by a parameter "learning" and setting section 23. The parameter "learning" and setting section 23 also generates a signal Ps which sets the parameter values as respective weighting coefficients of the neural network 14, and receives a signal Pr representing the current values of weighting coefficients of the neural network 14. If the weighting coefficients are held in respective registers, the signal Pr can be derived for example by successive scanning of the register contents. Output color density $R_d$, $G_d$, $B_d$ data values produced from the neural network 14 are applied to respective inputs of a set of comparators to be compared with corresponding $R_d'$, $G_d'$, $B_d'$ values that are read out from the color sample printing density data memory 20. That is to say, while the $R_a$, $G_a$, $B_a$ values for a specific one of the color patches 8b are being inputted to the neural network 14, the resultant $R_d$, $G_d$, $B_d$ values from the neural network 14 are compared with the color density printing values $R_d'$, $G_d'$, $B_d'$ that were actually used by the color printing section 15 for printing that color patch. The respective differences between these $R_d$, $G_d$, $B_d$ and $R_d'$, $G_d'$, $B_d'$ values are obtained as error outputs from the comparators and are inputted to the parameter "learning" and setting section 23. The parameter "learning" and setting section 23 responds by modifying the values of weighting coefficients in the neural network 14 (through the signal Ps) in accordance with the amount of error between the actual output values $R_d$d, $G_d$, $B_d$ and the "ideal" values $R_d'$, $G_d'$, $B_d'$. The new set of $R_d$, $G_d$, $B_d$ values that are then obtained as outputs from the neural network 14 are then compared with the "ideal" values $R_d'$, $G_d'$, $B_d'$, the weighting coefficients are accordingly modified, and so on. By repetitions of the "learning" operation, a desired degree of convergence can be obtained, i.e. the sum of the error quantities produced from the comparators can be reduced to a requisite level, after a suitable number of repetition.

In this embodiment, each of the neuron units of the neural network 14 receives each input value applied thereto as a set of of parallel bits, and generates a resultant output value as a set of up to 8 parallel bits. The output color density values $R_d$, $G_d$, B $B_d$ from the neural network 14 are outputted as three sets of 8 bits from respective ones of 3 neuron units which constitute the output layer of the network.

Figure 9:
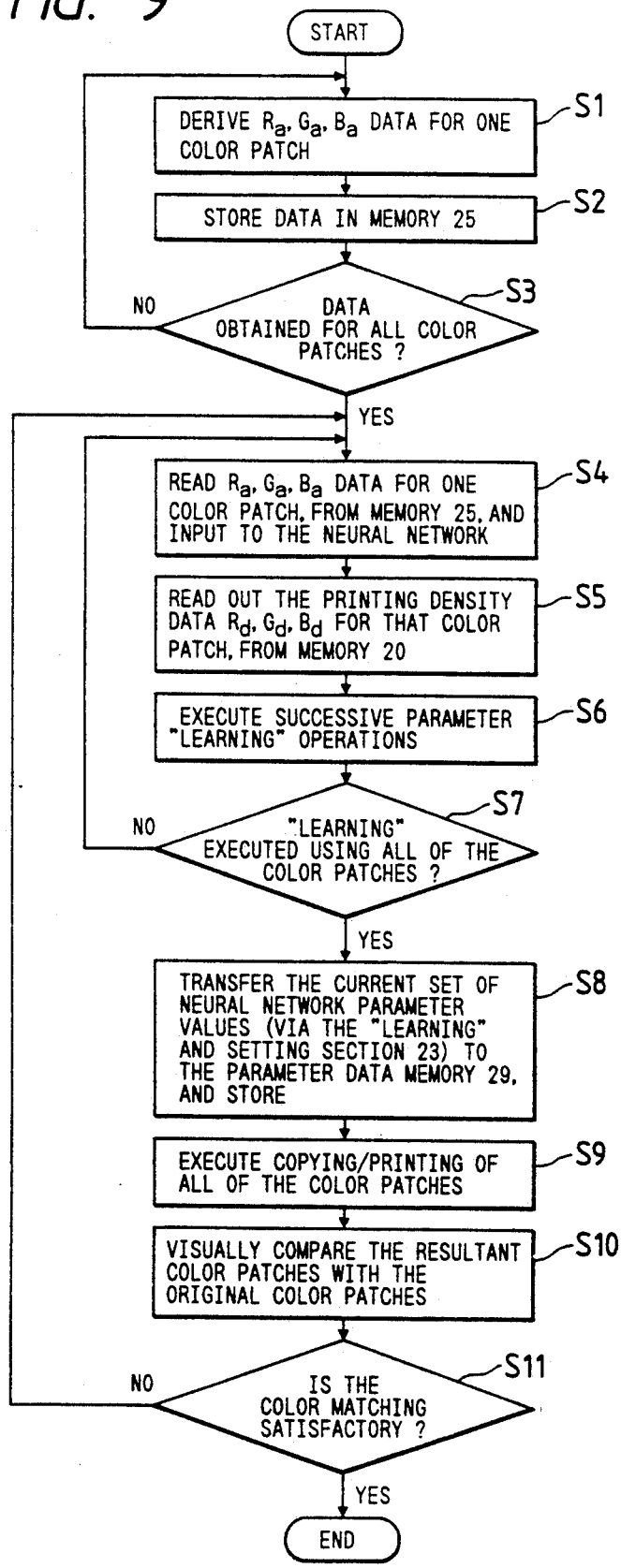
FIG. 9 is a flow chart for describing the sequence of operations executed during parameter value "learning"

During parameter value "learning" operation, as indicated in FIG. 9, the $R_a$, $G_a$, $B_a$ data for successive ones of the color patches 8b are read out from the sample analysis data memory section 25 and inputted to the neural network section 13. Specifically, while $R_a$, $G_a$, $B_a$ data for a first one of the color patches 8b is thus being supplied to the neural network section 13, the color density data $R_d'$, $G_d'$, $B_d'$ which were used to print that color patch are read out from the color sample printing density data memory 20 and inputted to the subtractor section 22. In the subtractor section 22, these $R_d'$, $G_d'$, $B_d'$ values are subtracted from the $R_d$, $G_d$, $B_d$ values respectively that are outputted from the neural network 14 at this time, i.e. the "ideal" color density data for that first color patch are compared with the color density data that are actually produced from the neural network 14 in response to the input rbga data. The resultant difference values, i.e. error information, are supplied to the parameter "learning" and setting section 23, to be used in computing amounts of adjustment to be applied to the weighting coefficients of the neural network 14 which will result in a reduction of the amount of error between the actual and the desired output values from the neural network. When new weighting coefficients have been established, this process is repeated, to obtain a further reduction in the amount of error. By repetitive execution of this process, a desired degree of convergence, i.e. error amount reduction, can be achieved. The $R_a$, $G_a$, $B_a$ and $R_d'$, $G_d'$, $B_d'$ values for the second one of the color patches 8b are then read out from the sample analysis data memory section 25 and color sample printing density data memory 20 respectively, and the above process repeated for the second color patch, and so on for the remaining color patches.

With this embodiment, a specific "teaching" algorithm computation is repetitively executed by the parameter "learning" and setting section 23, utilizing for each execution the current values weighting coefficients (as conveyed by the signal $P_R$) and the error values that are produced from the substractor section 22, with correction amounts for adjusting the parameter values being outputted from the parameter "learning" and setting section 23 (conveyed by the signal $P_S$) each time that an algorithm computation repetition has been completed. Examples of such algorithms for use in a neural network are described in the literature, for example as described by D. E. Rumelhart et al, in "Parallel Distributed Processing", Chapter 8, M.I.T. Press, Cambridge, (1986). Specifically, such an algorithm results in successively updated sets of parameter (weighting coefficient)

values being generated whereby the values of the outputs ($R_d$, $G_d$, $B_d$) from the neural network converge towards the target values (the corresponding $R_d'$, $G_d'$, $B_d'$ values).

The above corresponds to steps S4 to S7 in FIG. 9.

Figure 10:
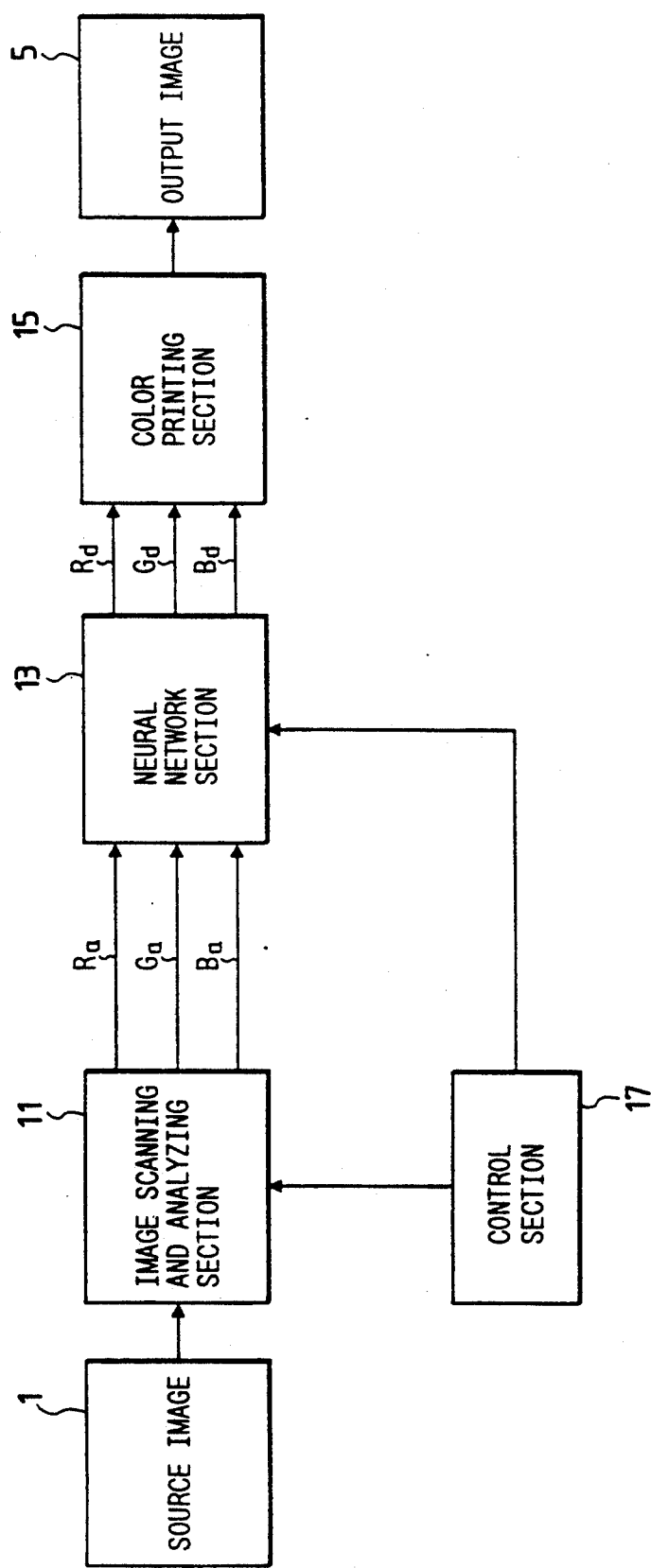
FIG. 10 is a block diagram showing the color copier apparatus configured for color copying operation.
Figure 11:
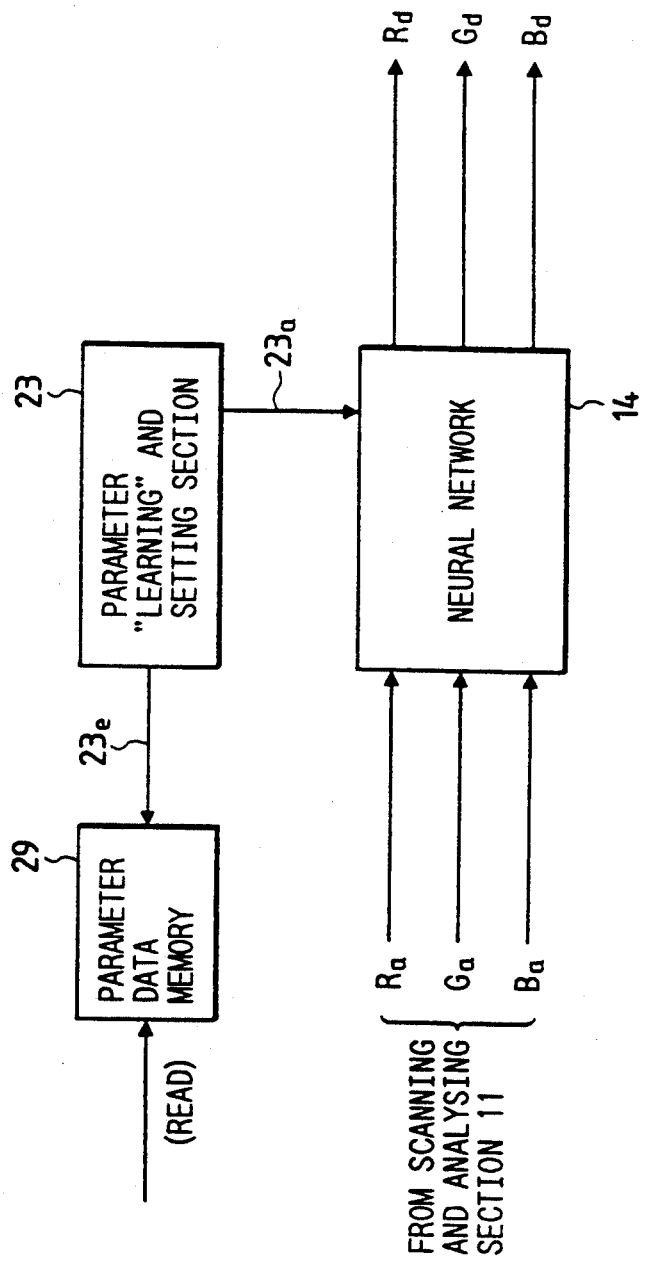
FIG. 11 is a block diagram showing the internal configuration of the neural network section of the color copier apparatus embodiment during color copying operation.

Upon completion of this "learning" operation for all of the color patches 8*b*, the finally obtained set of weighting coefficients of the neural network 14 are written into the parameter data memory 29 (step S8). The apparatus is now configured as shown in FIG. 10, with the internal configuration of the neural network section 13 being as shown in FIG. 11. The set of color patches 8*b* is again scanned as the source image 1, by the image scanning and analyzing section 11, resultant sets of (three 8-bit) $R_a$, $G_a$, $B_a$ values are obtained for successive picture elements, and these are inputted directly to the neural network 14 of the neural network section 13. In response to each of these $R_a$, $G_a$, $B_a$ sets, a corresponding set of $R_d$, $G_d$, $B_d$ color density values is outputted from the neural network 14, i.e. correction of each $R_a$, $G_a$, $B_a$ set to obtain a requisite $R_d$, $G_d$, $B_d$ set is executed by the neural network 14, and these $R_d$, $G_d$, $B_d$ values are supplied to the color printing section 15 for printing out a copy of the color patches 8 as the output image 5 (step S9 of FIG. 9).

The resultant printed copy is now compared with the original set of color patches 8*b* (step S10). This comparison can be done visually, although the invention is not limited to such a method. If the accuracy of reproduction indicated by the copied color patches is not judged to be satisfactory (step 11) then the steps S4 to S8 are repeated to obtain and store a set of neural network weighting coefficients which provide reduced levels of error in the neural network output values, then steps S10, S11 are repeated. When a sufficient degree of reproduction accuracy has been achieved, the finally obtained weighting coefficients are held stored, e.g. in the parameter data memory 29, and thereafter used for color copy operation with the apparatus configured as shown in FIGS. 10 and 11.

Although the above description has been given based on a system formed of separate section blocks, it will be understood that in actual practice it will be possible to implement many of the functions of these blocks (other than hardware required for image scanning and for color printing), including the neural network, by programed computer means, e.g. using a microprocessor or using two or more microprocessors in combination.

A color data correction apparatus according to the present invention provides the following advantages over a prior art apparatus in which correction is executed based on computations using predetermined equations:

a) Even when only a relatively small number of color samples (color patches) is used to establish the neuron network parameter values, i.e. less than 800 samples, a very high accuracy of reproduction can be achieved. This high accuracy results from the fact that correction is executed for the actual non-linear relationships between color analysis values obtained by scanning a source image and the color density values that must be used (i.e. by a printer section) to accurately reproduce the source image. In the case of a color copier apparatus for example, these relationships will vary in an unpredictable manner in accordance with the printing ink characteristics, manufacturing variations between different copiers, etc. With the present invention, accurate compensation for these non-linear relationships can be achieved by deriving an optimum set of neural network parameters (weighting values) for each individual copier apparatus.

b) A substantially higher accuracy of reproducing pastel colors (colors of various hues, having a low value of chrominance attribute, i.e. low saturation, and high value of lightness attribute) can be achieved than has been possible in the prior art. This accuracy can be maximized by utilizing, in deriving the optimized neural network parameters, a set of color patches which include a high proportion of pastel color samples.

What is claimed is:

1. In a color image reproducing apparatus including means (11) for scanning and color-analyzing an input image to derive color analysis data for said image, and color data correction means for operating on said color analysis data to obtain color density data for use in reproducing said input image, the improvement whereby said color data correction means comprises a neural network (14) which receives said color analysis data and produces said color density data.

2. In a color image reproducing apparatus including means (11) for scanning and color-analyzing an input image to derive color analysis data for said image, and color data correction means for operating on said color analysis data to obtain color density data for use in reproducing said input image, the improvement wherein said color data correction means comprises a neural network (14) which receives said color analysis data and produces said color density data, in which said color image reproducing apparatus includes printing means (15) responsive to said color density data for reproducing said input image as a printed color image, and in which parameter values of said neural network are established based on a comparison between color density data used to print a sample output image formed of a plurality of color samples and color density data produced by said neural network in response to color analysis data generated by scanning and color analysis of said sample output image.

3. An apparatus according to claim 2, in which said color data correction means comprises:

a color sample printing density data memory (20) for storing said color density data as said data are generated during printing of said sample output image;

subtractor means (29) for mutually subtracting color density data produced from said neural network and color density data read out from said color sample printing density data memory to thereby obtain as error data, for each of said color samples, amounts of difference between color density data used in printing said color sample and color density data produced from said neural network in response to color analysis data generated by scanning and color analysis of said color sample; and parameter computation means (23) for executing, based on a predetermined adaptive algorithm, repetitive computations for successively deriving updated values of said neural network parameters by utilizing said error data, and for setting said updated parameter values in said neural network.

4. An apparatus according to claim 1, in which said neural network comprises an input layer of neuron units for receiving said color analysis data as input digital signals, an output layer of neuron units for producing said color density data as output digital signals, and at least one intermediate layer of neuron units connected between said input and output layers.

5. In a color image reproducing apparatus including means (11) for scanning and color-analyzing an input image to derive color analysis data for said image, and color data correction means for operating on said color analysis data to obtain color density data for use in reproducing said input image,
   the improvement wherein said color image reproducing apparatus includes printing means (15) responsive to said color density data for reproducing said input image,
   means for providing color density data to said printing means for printing a printed color sample output image,
   said means for scanning operating for scanning the printed sample output image and for producing sample color analysis data representative thereof, and
   storage means for storing said sample color analysis data,
   said color data correction means comprising a neural network for receiving color analysis data and for producing therefrom color density data,
   said neural network connected to said storage means to receive said sample color analysis data therefrom for producing sample color density data, and
   means for establishing parameter values of said neural network based on a result of a comparison between said color density data used to print said printed sample output image and said sample color density data produced by said neural network in response to said sample color analysis data generated by scanning said printed sample output image.

6. An improved color image reproducing apparatus as recited in claim 5, wherein said means for scanning includes means for reflecting light from said printed sample output image and means for scanning said reflected light to produce said sample color analysis data representative thereof.

7. An improved color image reproducing apparatus as recited in claim 5, wherein said means for establishing parameter values of said neural network is operative independent of operator input color density data.

8. An improved color image reproducing apparatus as recited in claim 5, wherein said means for establishing parameter values of said neural network includes means responsive to a first operator command to apply an algorithm to said result of said comparison.

9. An improved color image reproducing apparatus as recited in claim 8, wherein said means for establishing parameter values is responsive to a predetermined criterion to identify convergence of the parameters for terminating application of the algorithm.

10. An improved color image reproducing apparatus as recited in claim 8, wherein said means for establishing parameter values is responsive to a second operator command for repeating application of said algorithm to said result of said comparison.

* * * * *

UNITED STATES PATENT AND TRADEMARK OFFICE
CERTIFICATE OF CORRECTION

PATENT NO. : 5,162,899
DATED : November 10, 1992
INVENTOR(S) : Motohiko Naka, et. al.

It is certified that error appears in the above-indentified patent and that said Letters Patent is hereby corrected as shown below:

On the Title page, item [54] and col. 1, line 1, insert the title to read as follows: change "ULTILIZING" to --UTILIZING--.

Signed and Sealed this

Nineteenth Day of October, 1993

*Attest:*

BRUCE LEHMAN

*Attesting Officer*     *Commissioner of Patents and Trademarks*